(12) United States Patent
Udvuleanu et al.

(10) Patent No.: US 8,804,553 B2
(45) Date of Patent: Aug. 12, 2014

(54) TONE RELAY SYSTEM AND METHOD

(75) Inventors: Mihai Udvuleanu, Bucharest (RO); Ion Dragos, Bucharest (RO)

(73) Assignee: Freescale Semiconductor, Inc., Austin, TX (US)

( * ) Notice: Subject to any disclaimer, the term of this patent is extended or adjusted under 35 U.S.C. 154(b) by 170 days.

(21) Appl. No.: 13/258,791

(22) PCT Filed: May 14, 2009

(86) PCT No.: PCT/IB2009/051997
§ 371 (c)(1),
(2), (4) Date: Sep. 22, 2011

(87) PCT Pub. No.: WO2010/131074
PCT Pub. Date: Nov. 18, 2010

(65) Prior Publication Data
US 2012/0044823 A1    Feb. 23, 2012

(51) Int. Cl.
*H04L 12/26* (2006.01)

(52) U.S. Cl.
USPC ........................................................ 370/252

(58) Field of Classification Search
USPC ......... 370/210, 352, 252, 358, 386, 428–429, 370/525–526; 455/28; 379/386, 418
See application file for complete search history.

(56) References Cited

U.S. PATENT DOCUMENTS

| | | | |
|---|---|---|---|
| 4,245,346 A * | 1/1981 | Grady et al. | 380/31 |
| 6,259,691 B1 | 7/2001 | Naudus | |
| 6,556,674 B1 * | 4/2003 | Li et al. | 379/386 |
| 6,671,252 B1 * | 12/2003 | Cannon et al. | 370/210 |
| 6,961,424 B1 * | 11/2005 | Vialle et al. | 379/418 |
| 2002/0154760 A1 * | 10/2002 | Branden | 379/386 |
| 2002/0184373 A1 | 12/2002 | Maes | |
| 2005/0135431 A1 * | 6/2005 | Lam et al. | 370/526 |
| 2006/0083220 A1 * | 4/2006 | Mekala et al. | 370/352 |

FOREIGN PATENT DOCUMENTS

| | | |
|---|---|---|
| JP | 2000-115270 A | 4/2000 |
| KR | 10-2005-0117703 A | 12/2005 |

OTHER PUBLICATIONS

International Search Report and Written Opinion correlating to PCT/IB2009/051997 dated Feb. 2, 2010.

\* cited by examiner

*Primary Examiner* — Kwang B Yao
*Assistant Examiner* — Syed M Bokhari

(57) ABSTRACT

A tone relay system comprises a tone detector arranged to receive a sequence of signal samples and to provide a plurality of media descriptors, each media descriptor comprising a cell of one or more of the signal samples and a tone detection meta-information for the cell; and a tone relay module arranged to receive each media descriptor, to perform an evaluation of the meta-information and modify the meta-information depending on one or more preceding media descriptors when a result of the evaluation indicates an undetermined tone state, and to provide the media descriptors with a predetermined delay to a tone aggregator module, when the meta-information indicates a tone, for transmission over a network, and to provide the media descriptors without the predetermined time delay to an encoder module, for transmission over the network, otherwise.

19 Claims, 13 Drawing Sheets

US 8,804,553 B2

TONE RELAY SYSTEM AND METHOD

FIELD OF THE INVENTION

This invention in general relates to transmission of tones, and more specifically to a tone relay system and method. This invention also relates to a voice over IP transmission system.

BACKGROUND OF THE INVENTION

A packet switched communication network may for example be used for communication of voice or audio data. For this, transport protocols, such as the Realtime Transport Protocol (RTP), are available. For Internet Protocol (IP) telephony systems or Voice over Internet Protocol (VoIP) transmission systems, it may be desired to communicate Dual Tone Multi-Frequency (DTMF) signals over the network, for example when a user needs to interact with an automated system, for example an automated call direction system.

Usually, voice data is provided to a vocoder (voice encoder) at the sender side. The vocoder employs a compression algorithm in order to reduce bandwidth of voice data transmitted over the network, the compressed voice data being provided to an RTP encoder for generating RTP-compliant packets containing the voice data as payload. However, applying a DTMF signal to the vocoder and transmitting the DTMF signal "inband" results in degradation of the DTMF signal due to the use of the compression algorithm, the compression algorithm having been designed for compressing voice signals and not DTMF tones. In order to avoid the degradation of the DTMF signal resulting from in-band communication of the DTMF signal, the Internet Engineering Task Force (IETF) Request For Comments (RFC) 2833 or RFC 4733 provide a framework for communicating the DTMF signal "out-of-band".

A DTMF detector is therefore employed in order to detect the DTMF signal and communicate data identifying the nature of the DTMF signal to an RFC 2833 or RFC 4733 encoder being coupled to the RTP encoder for communication of the data identifying the DTMF signal to a receiver where the DTMF signal is regenerated based upon the data identifying the DTMF signal. In order to provide uniformity in relation to DTMF signals, the Telecommunication Standardization Sector of the International Telecommunications Union (ITU-T) Recommendation Q.24 specifies certain conditions for a DTMF signal to observe in order to qualify as a valid DTMF signal.

However, false DTMF detection may result for example in sending a wrong RFC 2833 start packet or a DTMF interruption may result in sending a wrong RFC 2833 end packet, therefore probably affecting an ongoing transmission.

Furthermore, DTMF detectors are known to suffer from "DTMF leakage" which can effectively become appended to a given DTMF signal due to undetermined state periods, wherein the presence of the tone cannot be determined instantly, thereby extending the duration of the given DTMF signal.

SUMMARY OF THE INVENTION

The present invention provides a tone relay system, a tone relay method and a VoIP transmission system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Identical reference numerals in different figures refer to identical or similar components.

DETAILED DESCRIPTION OF THE PREFERRED EMBODIMENTS

Figure 1:
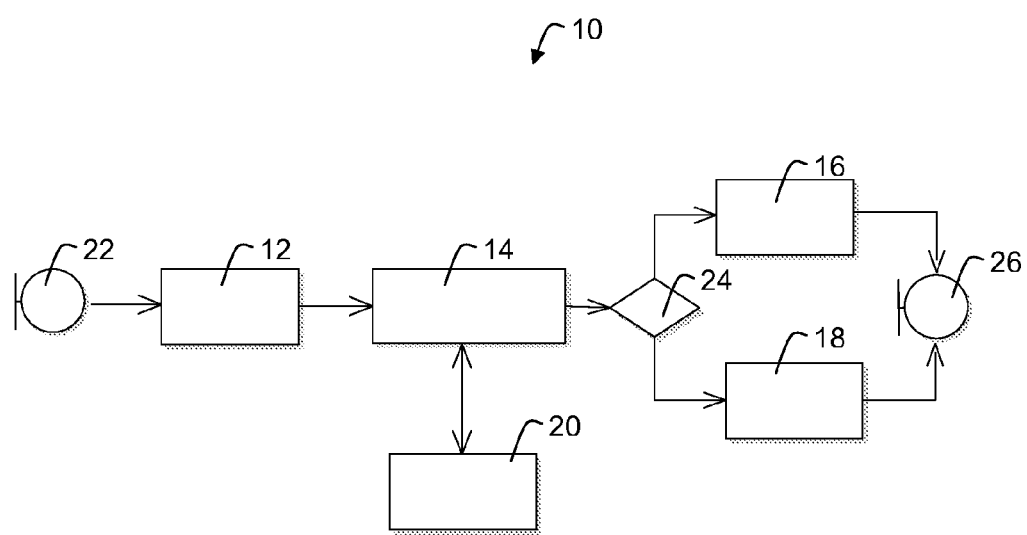
FIG. 1 schematically shows a block diagram of an example of an embodiment of a tone relay system.

Referring to FIG. 1, a schematic block diagram of an example of an embodiment of a tone relay system 10 is shown. The tone relay system 10 comprises a tone detector 12 arranged to receive a sequence of signal samples and to provide a plurality of media descriptors, each media descriptor comprising a cell of one or more of the signal samples and a tone detection meta-information for the cell. And it comprises a tone relay module 14 arranged to receive each media descriptor, to perform an evaluation of the meta-information and modify the meta-information depending on one or more preceding media descriptors when a result of the evaluation indicates an undetermined tone state, and to provide the media descriptors with a predetermined delay to a tone aggregator module 16, when the meta-information indicates a tone, for transmission over a network, and to provide the media descriptors without the predetermined time delay to an encoder module 18, for transmission over the network, otherwise.

The signal samples may for example be pulse code modulated (PCM) samples of an input signal. The input signal may be received via an input interface 22, for example a time division multiplex (TDM) interface, and may comprise tones and a stream of data, for example video data or audio data such as music and voice. The term "tone" refers to signalling tones, such as multi-frequency signalling tones, for example DTMF tones, off-hook warning tones etc., and may for example be used when setting or up or disconnecting a telephone call. The tone relay system 10 may be used as part of a sender-side of a telephone system using a network such as a packet switched network.

A tone detector 12 may receive the signal samples from the input interface 22. Tone detectors are frequently used in communication systems for monitoring received signals and identifying a presence of pre-defined signalling tones. The presented tone detector 12 may group the received stream of signal samples into cells, i.e. into one or a plurality of consecutive signal samples and perform a tone detection for the cell. The detection result may be an information about a presence or an absence of a tone, i.e. the presence of a "non-tone", which may be any other signal data. And it may provide additional information, such as for example a tone identifier, the energy of the tone etc. The shown tone detector 12 may generate and output media descriptors for each cell of samples, which at least comprise the cell and a related meta-information comprising the detection result.

The shown embodiment of a tone relay system 10 comprises a tone relay module 14 connected to receive the media descriptors from the tone detector 12. The tone relay module 14 may provide a post-processing of the received media descriptors, which may allow for determination and clarification of undetermined tone states, therefore avoiding or at least reducing relay of wrongly detected tones, for example caused by a noisy input signal, or wrong tone interruptions. An undetermined tone state may refer to a state of a signal period, wherein a presence of a tone, e.g. a DTMF tone, is uncertain and may for example be detected after a detected start of a potential tone before validity of the tone can be confirmed or after a detected end of a tone before validity of the end of the tone can be confirmed. Resolving undetermined tone states may allow for a highly accurate determination of a tone duration. For example, a start and an end of a DTMF tone may be validated according to ITU-T Recommendation Q.24. The tone relay module 14 may be arranged to detect and modify undetermined tone states based on a history of stored previous media descriptors, allowing for determination of a duration of a signal state after a potential start or end of a tone and comparison for example with a pre-defined minimum duration of a tone for confirmation.

After post-processing media descriptors and classifying cells previously having undetermined tone states as for example tone cells or non-tone cells, the descriptors may be provided to a decision unit 24 for decision whether to continue processing of the signal samples of a cell "inband" by an encoder module 18 for non-tone cells, for example a voice encoder or vocoder, or "out-of-band" by a tone aggregator module 16 capable of encoding tone cells. The tone aggregator may for example be an RFC2833 aggregator for building RFC 2833 compliant packets for transmission over a packet switched network, for example using the real time transfer protocol (RTP). Either processing path may be connected to a network interface 26 interfacing with a network such as a packet switched network, for example using the internet protocol. For example, using an inband and an out-of-band processing path for media descriptors belonging to a telephone call comprising voice data and tones such as DTMF tones may allow for sending the tones via the network interface 26 and across the communication network without affecting transmission of the voice data. Although a predetermined delay due to building and evaluating media descriptor history may be introduced for tones such as DTMF tones, the voice signal may be transmitted without delay caused by the tone relay.

And the tone relay system 10 may comprise a delay line 20 arranged to store the one or more preceding media descriptors for a time corresponding to the predetermined delay. A delay line 20 may for example be a register buffer, memory or storage capable of storing media descriptors preceding a descriptor currently received by the tone relay module 14. The amount of stored media descriptors may correspond to a time period at least for confirming a valid tone duration and a valid silence duration after an end of a tone. The delay line 20 may be connected to the tone relay module 14 and may save, provide and remove previous media descriptors depending on commands received by the tone relay module 14. Furthermore, the tone relay module 14 may be set up to insert silence cells into the delay line between initial tone detection and the moment of tone confirmation, so that a jitter buffer on the receiver-side of the network may at least partly be relieved from operating on a concealment of missing frames.

The tone detector 12 providing the media descriptors may be arranged to analyze the cells of received input signal samples and generate the meta-information, wherein the meta-information may comprise a tone detected information or a non-tone detected information. For example, each sequence of DTMF tones comprises periods of silence, i.e. periods wherein a signal level is below a certain pre-defined threshold, of a minimum duration, for example according to ITU-T Recommendation Q.24, between tones. Accordingly, a tone has a start and an end and a duration between start and end, which may have a certain minimum duration, for example according to ITU-T Recommendation Q.24, to qualify for a valid tone detection. If the measured duration within a cell does not match the pre-defined minimum, the tone state may be classified as an undetermined tone state. If a cell comprises non-silence signal samples but does not comprise characteristics indicating a tone, the cell may be classified as comprising a "non-tone". For example, a DTMF tone may be detected with respect to the signal frequencies it may comprise according to Q.24.

The relay module 14 may be arranged to determine a presence of the undetermined tone state and verify or change the meta-information of the media descriptor and the preceding media descriptors to the tone detected information, a silence information, or the non-tone detected information, therefore resolving undetermined tone states before providing the media descriptors to the decision module 24. Signal samples comprised in a media descriptor carrying the silence information may be replaced by digital silence by the tone relay module 14. The decision module 24 may send media descriptors comprising the tone detected information to the tone aggregator module 16 for out-of-band transmission, while media descriptors comprising silence or the non-tone information may be send to the encoder module 18 for inband transmission.

In one example embodiment of the tone relay system 10 the tones may be dual-tone multi-frequency (DTMF) tones. The tone relay system 10 may for example be used as part of a telephone communication system. It is well known to set up and disconnect telephone calls using DTMF tones.

The network may for example be a packet switched network, such as the internet, therefore enabling reliable telephone communication, e.g. using a voice over internet protocol (VoIP) application.

Figure 2:
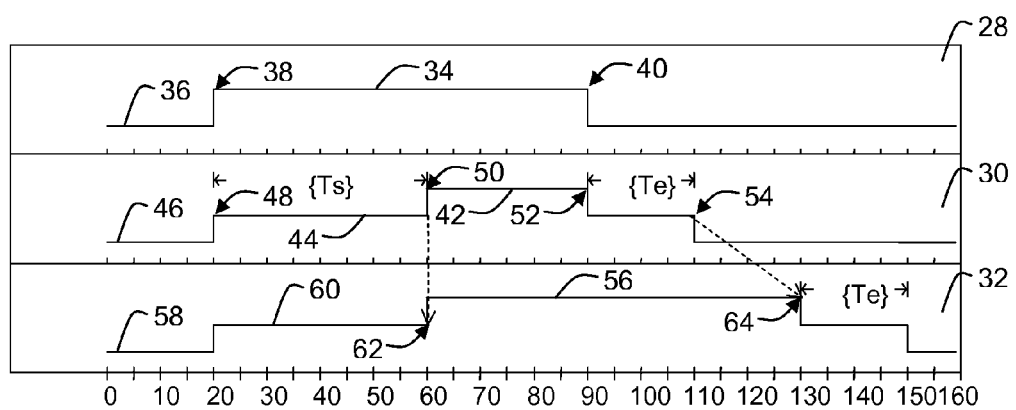
FIG. 2 schematically shows a timing diagram illustrating a behaviour of an embodiment of a tone relay system on detection of a tone.

Referring now also to FIG. 2, a timing diagram illustrating a behaviour of an embodiment of a tone relay system on detection of a tone is shown. This timing diagram shows the behaviour of the tone relay system when a DTMF tone passes through the system. The input timeline 28 may represent the stream of signal samples captured from an input interface of the tone relay system, which may for example be part of a VoIP Media Gateway.

In the shown example representation, the input stream is defined by only two states. "Tone" 34 may be a state which is defined by the presence of a DTMF tone within the incoming PCM samples. It is a task of the tone detector to indicate the comprised tone. "Non-tone" 36 may be the state wherein the PCM samples contain anything else but DTMF tones.

The shown "intermediary" timeline 30 illustrates the decisions performed by the tone relay module to classify the signal cell as "tone" 42, "undetermined" 44 or "non-tone" 46. "Ts" may represent the time interval for a "DTMF Start" event 38, 48 to be confirmed and "Te" may represent the time interval for a "DTMF End" event 40, 52 to be confirmed.

The relay module may be arranged to confirm a start of the tone depending on a first duration Ts after an indicated start 38, 48 of the tone. This may allow a decision, whether or not the detected unconfirmed start 48 of a tone indeed belongs to a valid tone or to a wrongly detected false tone. As soon as the DTMF detector indicates the first samples which may contain a DTMF tone, the tone relay module preliminarily classifies the state as "undetermined" 44. In order to be a valid DTMF tone, according to Q.24, the potential tone has to be continuously detected for a first duration of at least Ts before being regarded as a confirmed tone 42, otherwise a false detection may be assumed. Therefore, the start of the tone may be confirmed 50 only after a delay of Ts. The same guiding principle is applied when the DTMF detector does not sense a DTMF tone anymore 52. In this case the tone relay module preliminarily applies the undetermined tone state 44, because it can not be sure whether it is a DTMF interruption which shall be ignored or the end of the DTMF tone. After Te, the end of the tone may be confirmed 54.

In order to resolve the undetermined tone states, an algorithm applied by the tone relay module may introduce a delay of Ts, (assuming Te equal to or less than Ts). This delay may be applied only to the DTMF tones, in order to have the confirmed start decision before sending the start event and the confirmed end decision before sending the end event when sending cells comprising a tone to the tone aggregator for encoding for example in RFC2833 packets.

In an embodiment of the tone relay system, the first duration may be 40 milliseconds (ms) or more. The length of the first duration Ts may be selected depending on the encoded tones to be detected. 40 ms are the minimum DTMF tone duration in compliance with ITU-T Recommendation Q.24.

The first duration may correspond to the predetermined delay. The predetermined delay of the tone signals applied to the tone aggregator for "out-of-band" transmission may be the first duration Ts. A shorter delay may for example not allow for correctly resolving undetermined tone states, a longer delay may add additional unnecessary delay to the tone signal to be sent across the network.

The output timeline 32 represents the output of the tone relay module which is characterized by three states in the shown example. "Non-tone" 58 represents a state in which the relay module does not modify the input stream, but passes the PCM samples from input to output. "Digital Silence" 60 represents the state in which the input data, which may be PCM data, may be replaced with digital silence, either until a start of a tone can be decided 62 or until an end of a tone can be decided 64. "Tone" 56 is the state in which the DTMF tone may be forwarded to the tone aggregator.

Figure 3:
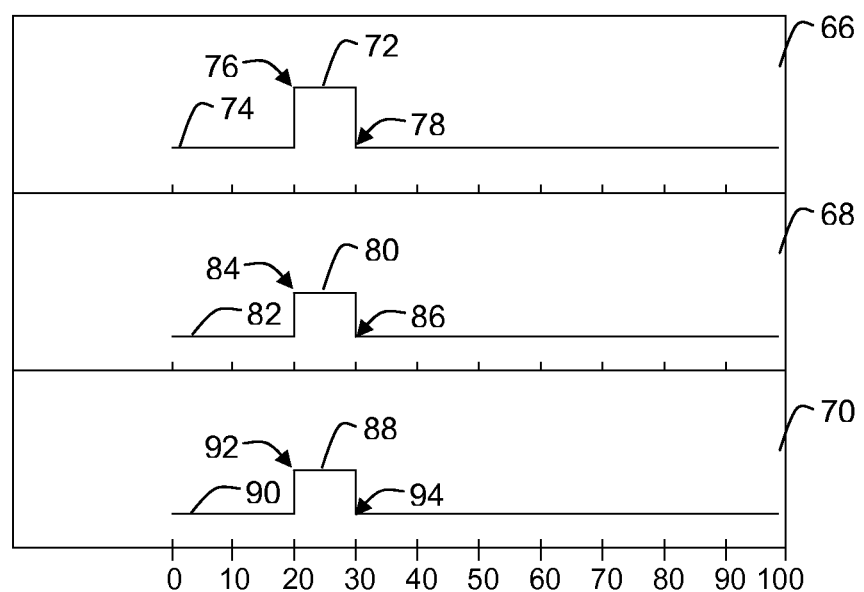
FIG. 3 schematically shows a timing diagram illustrating a behaviour of an embodiment of a tone relay system on false detection of a tone.

Referring now also to FIG. 3, a timing diagram illustrating a behaviour of an embodiment of a tone relay system on false detection of a tone is shown.

The tone relay module may be arranged to filter false tones, i.e. for example non Q.24 compliant tones, which last less than Ts. In the shown example, Ts is assumed greater than 10 ms, for example 40 ms.

The input timeline 66 shows a change from "non-tone" level 74 to "tone" level 72 after detection of a tone start event 76. However, the tone may be aborted 78 after a time less than Ts. The intermediary timeline 68 shows a change from "non-tone" 82 to "undetermined state" 80 after detection of an unconfirmed start of a tone 84. After abort 78 of the input detected tone, a false start is indicated 86. The output timeline 70 of the tone relay module may not comprise any tone, since the false start of a tone may have been efficiently filtered and suppressed. The output signal changes from "non-tone" state 90 to provision of digital silence 88 after unconfirmed start 92. However, after the false start has been detected 94, the tone relay module output switches to "non-tone" state 90.

When a false start of a DTMF tone is detected by the tone detector, there will usually be a DTMF abort indication 78 which will follow during the start confirmation time Ts. During this time, digital silence 88 will be produced at the output of the relay module, but the tone may not be forwarded to the tone aggregator.

A non-tone period which lasts less than Te may be considered an interruption and not an end of a tone.

Figure 4:
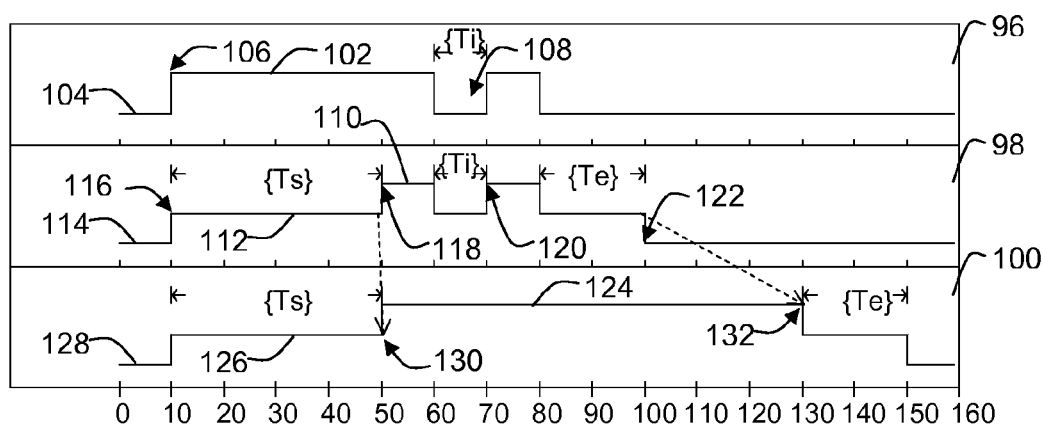
FIG. 4 schematically shows a timing diagram illustrating a behaviour of an embodiment of a tone relay system on detection of a tone interruption.

Referring now also to FIG. 4, a timing diagram illustrating a behaviour of an embodiment of a tone relay system on detection of a tone interruption is shown. Timeline 96 shows a signal at the input of the tone relay module. Timeline 98 illustrates intermediary signal cell classification decisions taken by the tone relay module. Timeline 100 shows an example of the states of the signal being output by the tone relay module.

The input signal comprises a "non-tone" state 104 and after detection of a start event 106 it changes to "tone" 102. However, in the shown example the ongoing tone is subject to a tone interruption period or pause Ti 108. The tone relay module changes its input signal classification from "non-tone" 114 to "undetermined tone state" 112 after unconfirmed indication 116 of a tone start event. After a duration Ts, the start event may be confirmed 118 and signal classification may change to "tone" 110. The interruption may be detected as a possible end of tone. However, since Ti is shorter than Te in the shown example, the possible end of tone can be classified as a false end 120. Later on after the tone has ended and after a duration Te, a correct end of tone may be confirmed 122.

The output timeline 100 shows that the tone relay module may switch from "non-tone" 128 to digital silence 126 when an unconfirmed start of a tone occurs. However, after confirmation 130 the state changes to "tone" 124 which is kept until the end of tone is confirmed 132. The output timeline 100 therefore does not comprise the tone interruption which has been removed by the tone relay module. The tone relay system may filter the DTMF interruptions in order to avoid sending false DTMF stop events when these occur.

The relay module may be arranged to confirm an end of the tone depending on a second duration Te after an indicated end of the tone. In order to confirm an "End of Tone" event, the tone relay module waits for an amount of time equal with a second duration Te. If another start event 120, which belongs to the same tone, occurs during this time, the algorithm applied by the tone relay module will decide that the previous "End of Tone" was in fact an interruption and may be ignored. The tone relay module may introduce a delay of Ts into the stream of tones and assuming Ts>Te, which holds true according to ITU-T Recommendation Q.24, it may therefore be able to filter all or at least some of the DTMF interruptions.

In an embodiment of the tone relay system, the second duration may be 20 milliseconds or less. The length of the second duration Te may be selected depending on the duration of silence between tones to be detected. A duration of less than Te may indicate an interruption instead of a silence period. 20 ms are a silence duration between DTMF tones for compliance with ITU-T Recommendation Q.24 for most European countries. In other words, a maximum allowed tone interruption according to Q.24 recommendation may be 20 ms. However, other countries allow for different durations of signal interruption less than 20 ms, for example 12 ms or 10 ms.

Figure 5:
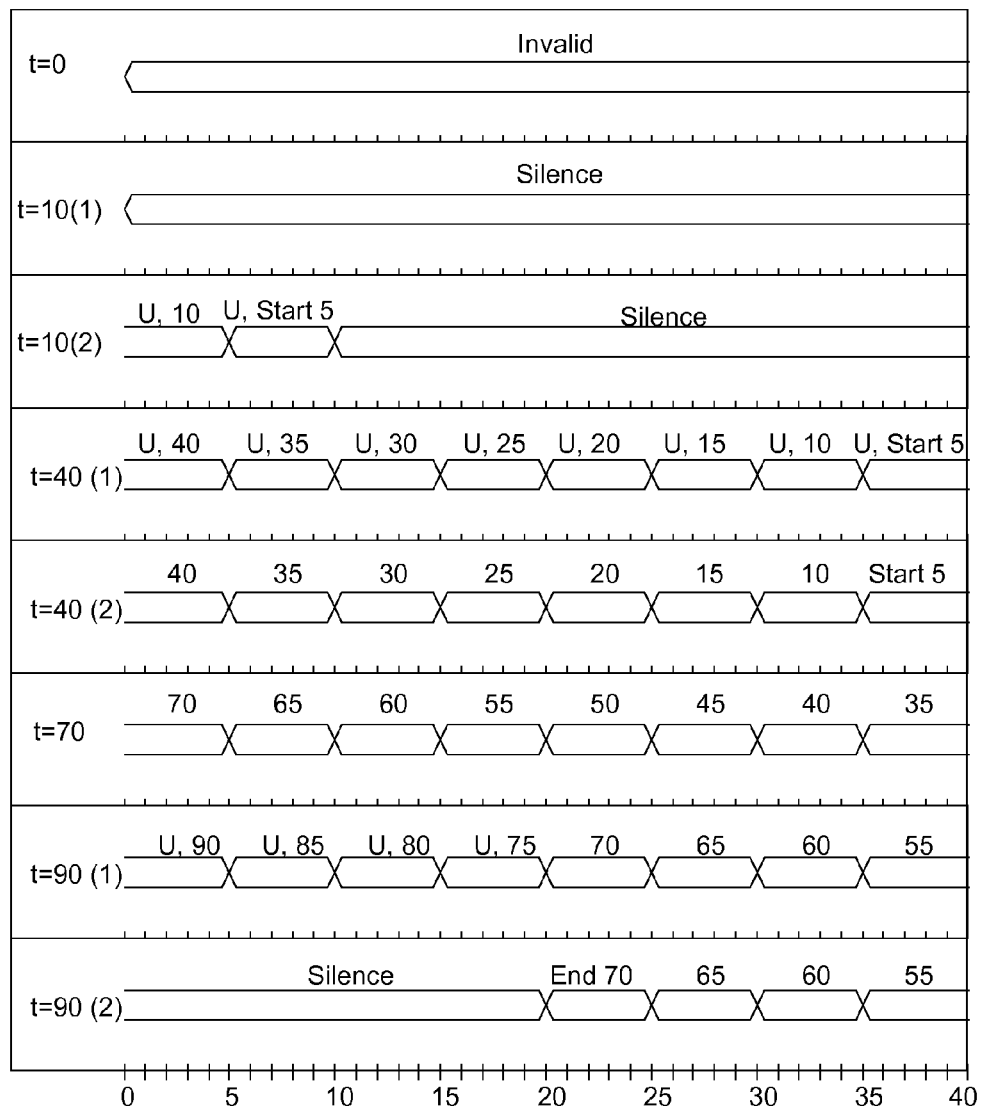
FIG. 5 schematically shows a timing diagram illustrating a status of a delay line of a tone relay system during a tone passing through the system.

Referring now also to FIG. 5, a timing diagram is shown illustrating a status of a delay line of a tone relay system during a tone passing through the system. This timing diagram is an example illustrating the status of the delay line, which may be a buffer, while one DTMF tone is passing through the tone relay module. The delay line may be configured as a queue. A new media descriptor may be inserted at the left shown side and the output of the tone relay module may be retrieved from the right side.

According to Q.24, the minimum tone duration may be 40 ms. By implementing a DTMF delay line buffer of 40 ms, the Q.24 compliance for the relayed tones may be ensured. In the shown example, the precision of the DTMF information was chosen to be one record for each 5 ms.

The delay line may comprise two different states of operation: During an "invalid" state there are no DTMF tones to be processed (t=0), and the tone relay algorithm applied by the tone relay module may be inactive and may not modify the input stream. During an "active" state of operation, the delay line may contain at least one cell having a DTMF tone information.

In the shown example, at time instant t=10, there is a DTMF detection at the input side. Timeline t=10(1) illustrates the situation before, t=10(2) after processing the detected potential DTMF tone cells. At time instant t=10, the tone is not confirmed, and it may or may not be a false detection. It will be confirmed if its duration is found to be longer than Ts, e.g. Ts=40 ms. The first action is to mark all the buffer cells with silence (see T=10(1)). Afterwards, two DTMF tone cells are inserted into the buffer marked as unconfirmed (U). Also two cells (10 ms) from the head of the buffer are forwarded to the output side. Thus until the tone is confirmed, digital silence will be output from the delay line buffer.

After 40 ms, the tone can be confirmed. Timeline t=40(1) represents the moment before running an algorithm to resolve the unconfirmed state, and t=40(2) represents the moment after running the algorithm, when the start of tone is confirmed. As a consequence, all the DTMF cells that reach the output will have an unconfirmed flag cleared.

In the shown example, the tone ends at time instant t=70, but the tone relay module can not verify the end until t=90, because the time needed for confirming the End event is Te=20 ms in the shown example. When the stop is confirmed, cf. t=90(1), the tone relay module replaces the undetermined period with silence cells, and places the End indication at the latest DTMF cell as shown in timeline t=90(2).

The signal samples may comprise voice or music samples. However, the input signal may additionally or instead comprise image, video, or other data samples, for example data for a facsimile transmission.

Figure 6:
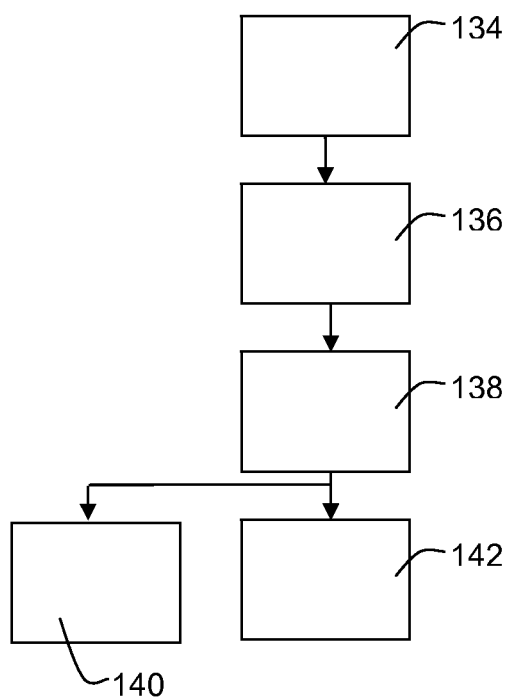
FIG. 6 schematically shows a flow diagram of a first example of an embodiment of a tone relay method.

Referring now to FIG. 6, a flow diagram of a first example of an embodiment of a tone relay method is shown. A tone relay method may comprise receiving 134 a sequence of signal samples; providing 136 a plurality of media descriptors, each media descriptor comprising a cell of one or more of the signal samples and a tone detection meta-information for the cell; performing an evaluation of the meta-information and modifying 138 the meta-information depending on one or more preceding media descriptors when a result of the evaluation indicates an undetermined tone state; providing 140 the media descriptors with a predetermined delay to a tone aggregator module, when the meta-information indicates a tone, for transmission over a network; and providing 142 the media descriptors without the predetermined time delay to an encoder module, for transmission over the network, otherwise.

The described method allows implementing the advantages and characteristics of the described tone relay system as part of a tone relay method.

Figure 7:
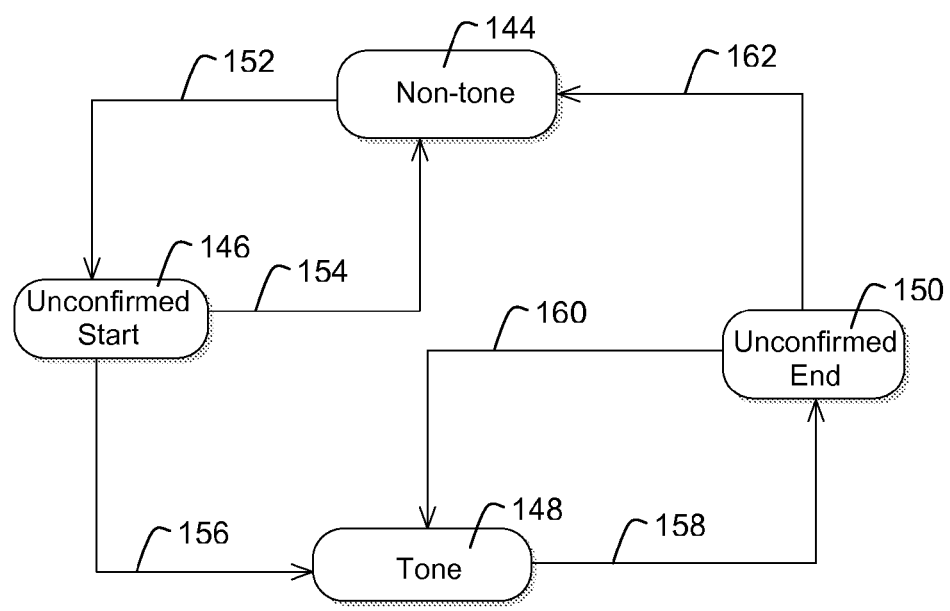
FIG. 7 schematically shows a state representation diagram of a second example of an embodiment of a tone relay method.

Referring now also to FIG. 7, a state representation diagram of a second example of an embodiment of a tone relay method is shown and explained below for an example of tones being DTMF tones to be detected in compliance with Q.24. As illustrated, a tone relay method may for example be represented as having four states:

Non-tone 144: when there is no DTMF tone detected in the input signal stream. If there is no entry in the delay line (for example after a previous DTMF has just ended), the method may pass the input data to the output unchanged.

Unconfirmed Start 146: when the previous input cells have indicated the presence of a DTMF tone, but it does not have a duration of at least Ts. During this state, the media descriptors having the undetermined tone state information may be inserted into the delay line.

Tone 148: If the current tone lasts for more than Ts, it is confirmed a valid tone;

Unconfirmed End 150: The DTMF detector may detect a tone interruption in the input stream, but the method cannot decide yet if it is an interruption error or an end of tone. This decision can be taken after Te.

The method may for example change from "non-tone" state 144 to state "unconfirmed start" 146 on detection of an unconfirmed start event 152. On detection of a tone abort 154, the method may invalidate the delay line queue and return to "non-tone" state 144. However, if Ts elapses 156, the presence of a tone can be confirmed and the method may change to "tone" state 148. On detection of an end of tone 158 not yet confirmed, the method may switch to "unconfirmed end" state 150. However, if new updates may be received 160, the previous tone cells can be confirmed and the method may change to "tone" state 148 again. But if after Te the end of tone can be confirmed 162, the method may replace cells corresponding to Te from the tail of the delay line queue with digital silence and may mark the tone end at the next cell after Te. Then the method may change back to "non-tone" state 144.

The start event may contain a leakage duration, the time required by the detector to decide it is indeed a start event. This duration may be added into the DTMF delay line in order to preserve the exact duration of the tone.

Figure 8:
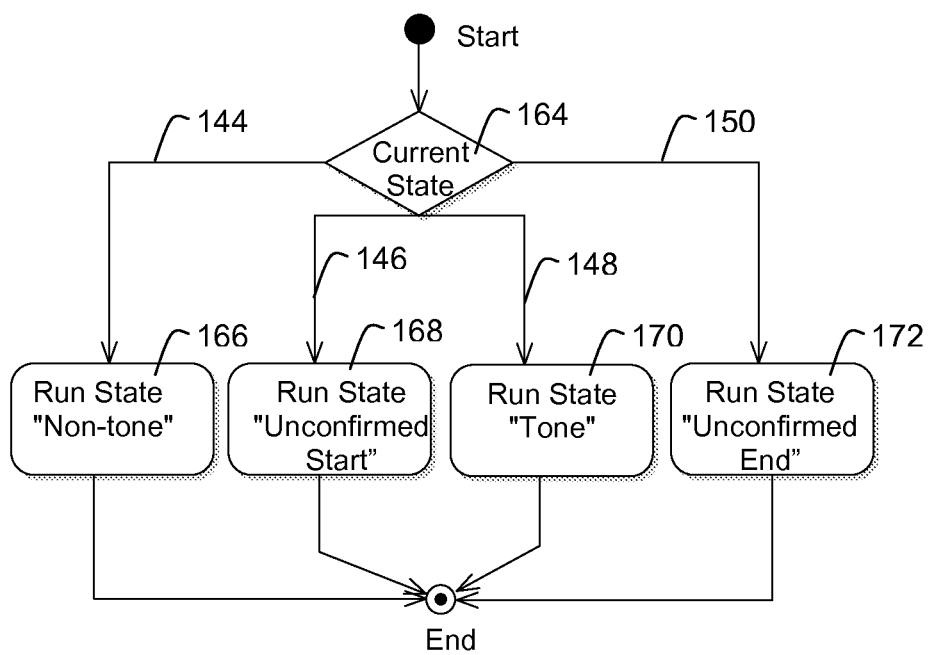
FIG. 8 schematically shows a flow diagram of a second example of an embodiment of a tone relay method.

Referring now also to FIG. 8, a flow diagram of a second example of an embodiment of a tone relay method is shown, giving an overview over the method to be applied to the states to be explained in greater detail in connection with FIG. 9, FIG. 10, FIG. 11, and FIG. 12. If the current state 164 is "non-tone" 144, the method may perform steps in order to run state "non-tone" 166. If the current state 164 is "unconfirmed start" 146, the method may perform steps in order to run state "unconfirmed start" 168. If the current state 164 is "tone" 148, the method may perform steps in order to run state "tone" 170. If the current state 164 is "unconfirmed end" 150, the method may perform steps in order to run state "unconfirmed end" 172.

An algorithm according to the method may be repeated for each new media descriptor. If for example the media descriptor resolution is 5 ms, then the algorithm may run every 5 ms.

Figure 9:
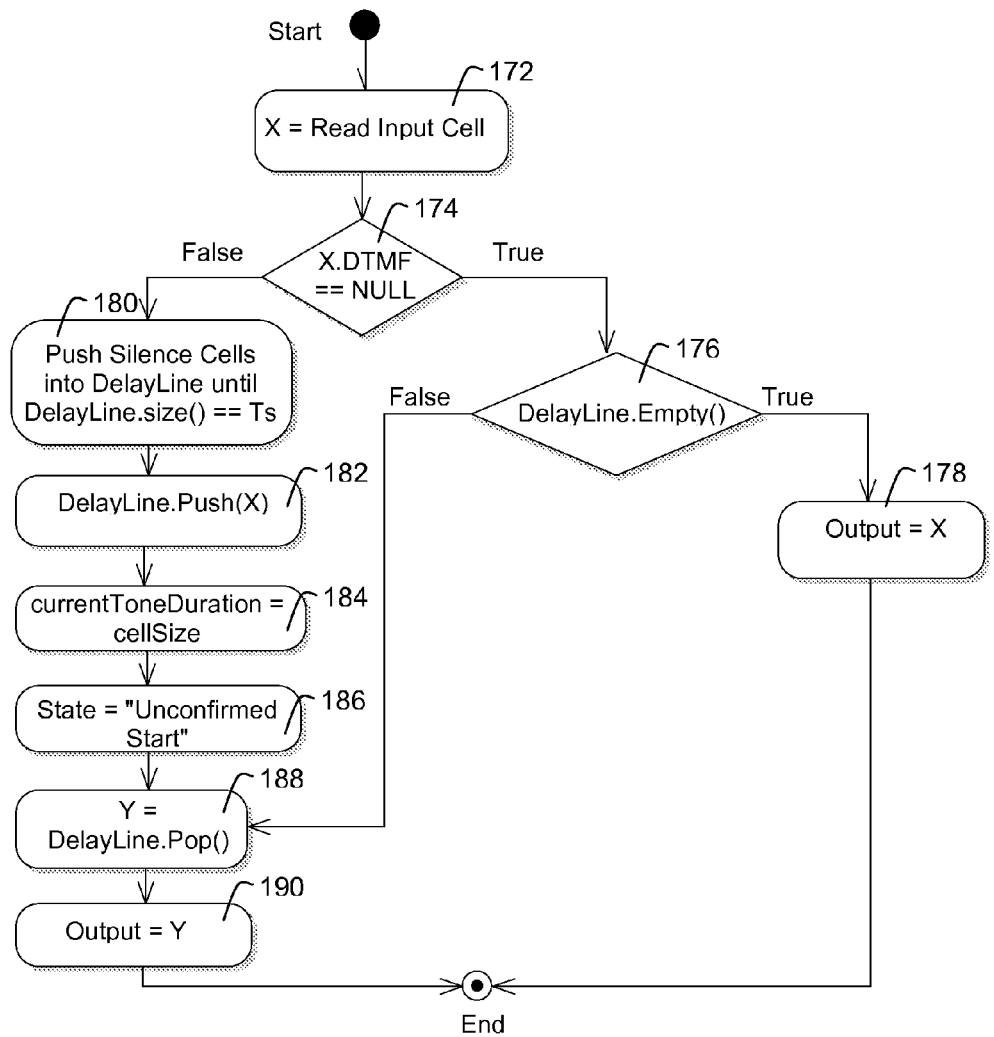
FIG. 9 schematically shows a flow diagram of a run state "non-tone" of the second example of an embodiment of a tone relay method.

Referring also to FIG. 9, a flow diagram of a run state "non-tone" of the second example of an embodiment of a tone relay method is shown.

For the sake of clarity, an object oriented notation may be used for labelling components in flow diagrams FIG. 9, FIG. 10, FIG. 11, and FIG. 12, e.g. object.Method( ); object.Field.

After reading an input signal cell from the tone detector, the cell may be classified as containing a DTMF tone or not 174.

Path 176, 178 refers to the situation where no tone has been detected recently. The delay line is empty 176. In this case the input cells may not be altered and may be sent to output unchanged 178.

Path 176, 188, 190 may refer to the situation where the currently processed cell does not have a DTMF indication, but the delay line is not empty 176, indicating that there was a tone which has finished recently. In this case the previous cell may be extracted from the delay line 188 and the input data may be replaced by the cell extracted from the delay line 190.

Path 180, 182, 184, 186, 188, 190 may refer to the situation where the current cell has an indication of a DTMF tone 174. In that case the delay line may be filled with silence 180. It may or may not be currently empty. The purpose is to add the maximum amount of silence, up to Ts, in order to separate the current tone from the previous. The input media descriptor may be inserted into the delay line 182 and the method may output a descriptor 190 taken from the front of the queue 189. As it can not be determined instantly whether or not the currently indicated DTMF tone is a false tone, the method may set the currently known tone duration to the duration of the cell 184 and may continue with "unconfirmed start" state 186.

Figure 10:
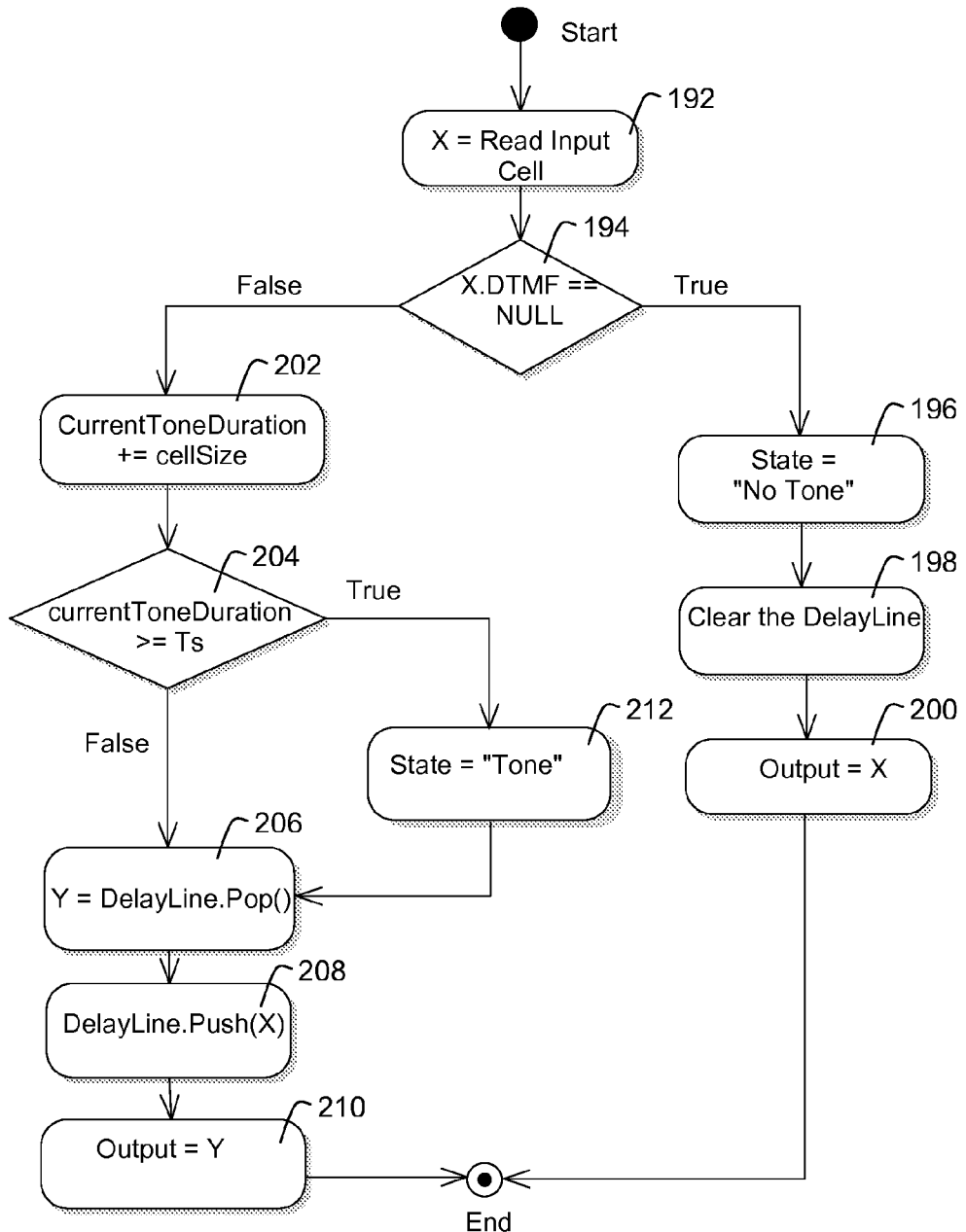
FIG. 10 schematically shows a flow diagram of a run state "unconfirmed start" of the second example of an embodiment of a tone relay method.

Referring now also to FIG. 10, a flow diagram of a run state "unconfirmed start" of the second example of an embodiment of a tone relay method is illustrated. During this state, a period of successive DTMF cells is expected in order to confirm that the tone is valid, for example according to the Q.24 requirements. An input signal cell is read 192 into the tone relay module.

Path 196, 198, 200 may refer to a sequence to be executed when the current cell is not detected as a tone cell 194. Hence, the current tone is a false indication and the method may continue with the "non-tone" state 196, remove all items from the delay line 198, and output the current input cell 200.

Path 202, 204, 206, 208, 210 may refer to a sequence to be executed when there was a sequence of DTMF cells, together having a duration 202, but the minimum DTMF tone duration Ts, has not been reached yet 204. A cell is retrieved from the delay line 206, the new cell is added to the delay line 208 and the retrieved cell is output 210.

Path 202, 204, 212, 206, 208, 210 may correspond to a situation where the tone is confirmed to have a duration of at least Ts. Therefore the method will continue with the confirmed "tone" state 212.

Figure 11:
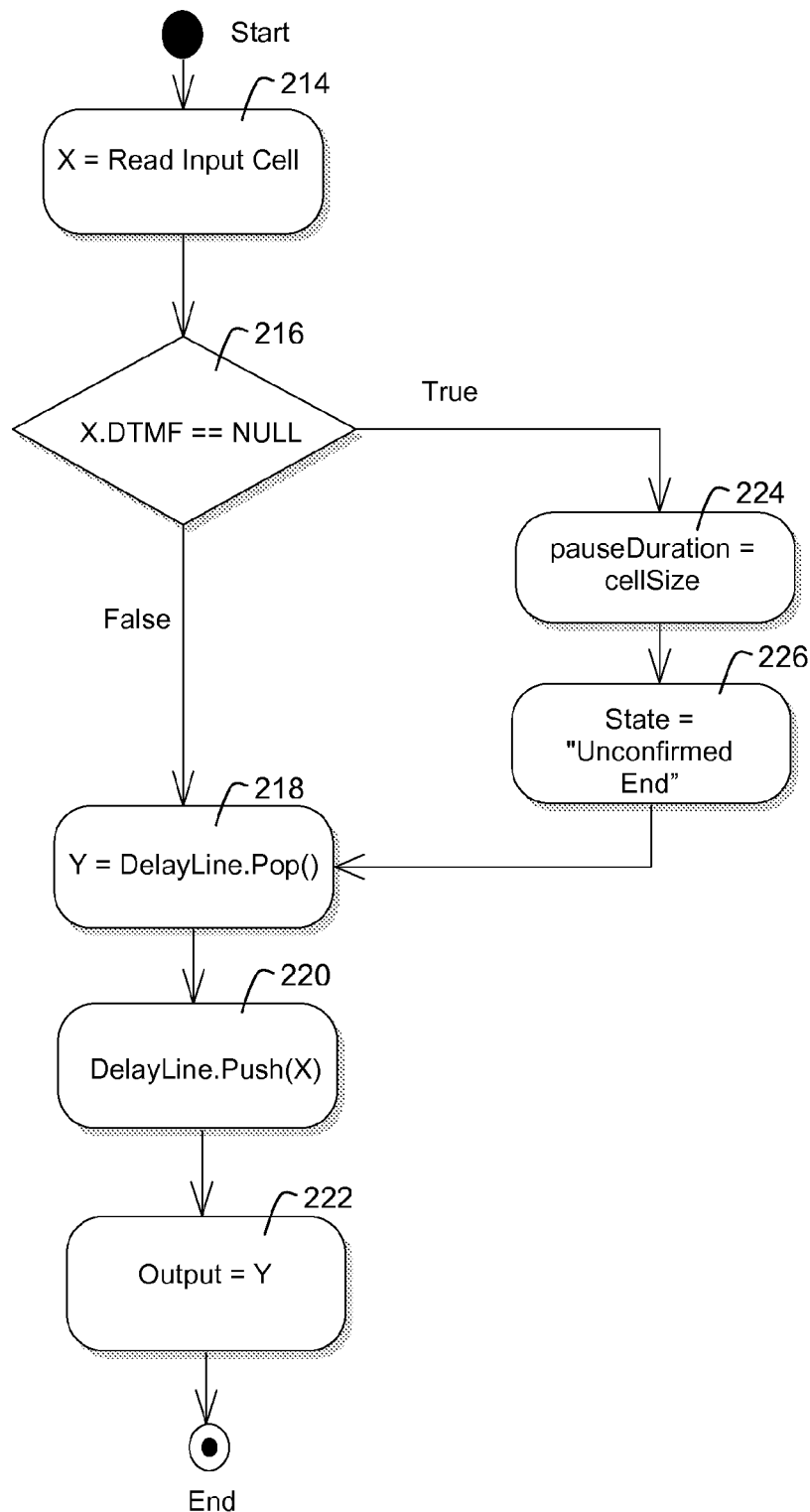
FIG. 11 schematically shows a flow diagram of a run state "tone" of the second example of an embodiment of a tone relay method.

Referring now to FIG. 11, a flow diagram of a run state "tone" of the second example of an embodiment of a tone relay method is shown. This state may be activated when the current DTMF tone is confirmed, having a duration longer than Ts.

An input signal cell retrieved from the tone detector is read 214 by the tone relay module.

During "tone" state, all the tone information may pass through the delay line and therefore it may be delayed with Ts. If the read input cell is detected to be a tone cell 216, a path of steps 218, 220, 222 may be executed. A previous cell may be retrieved from the delay line 218, the newly read cell may be added to the delay line 220 and the previous cell may be output 222. As shown in path 224, 226, 218, 220 222, after reception of a non-tone cell, the method may update a pause duration counter 224 and continue with "unconfirmed end" state 226.

Figure 12:
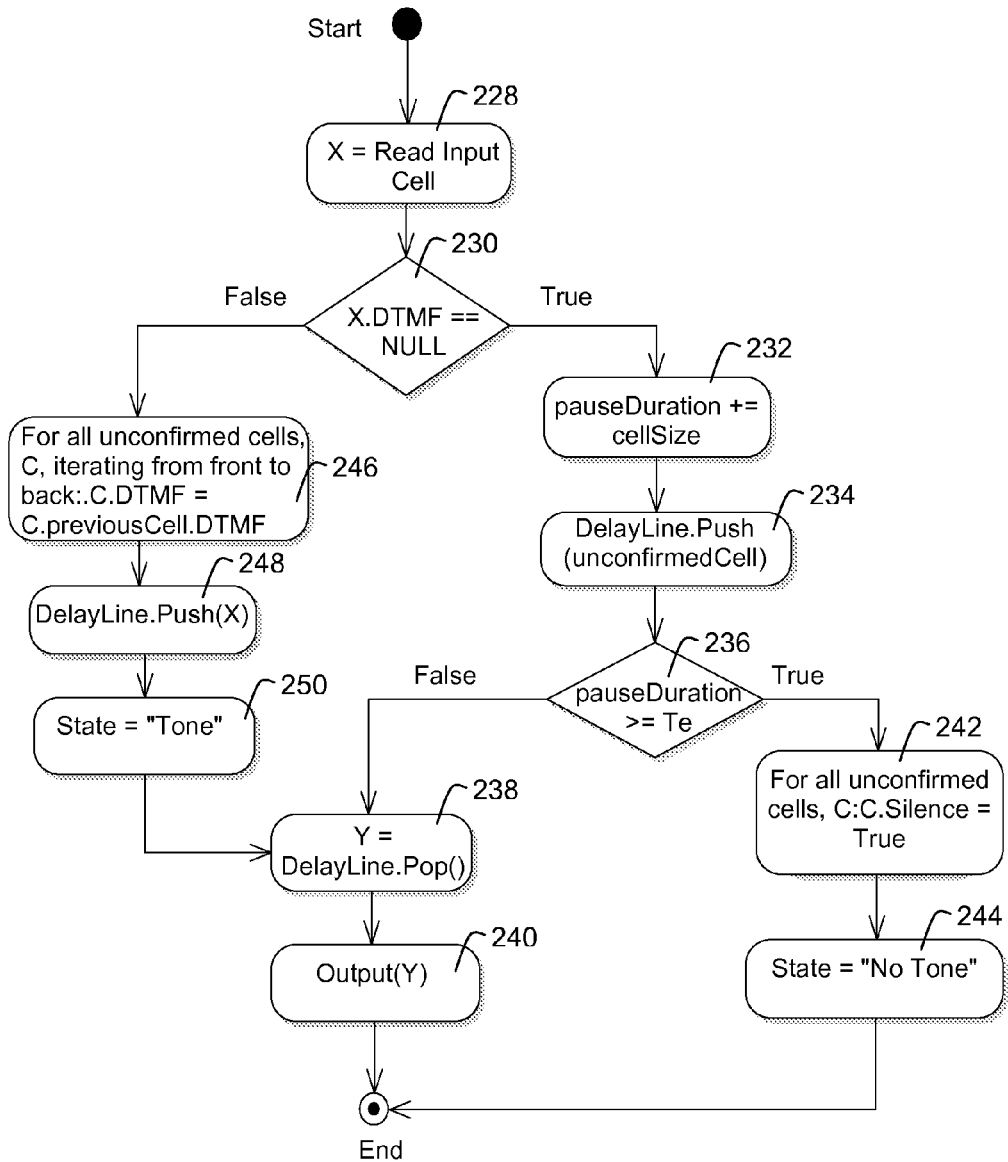
FIG. 12 schematically shows a flow diagram of a run state "unconfirmed end" of the second example of an embodiment of a tone relay method.

Referring now to FIG. 12, a flow diagram of a run state "unconfirmed end" of the second example of an embodiment of a tone relay method is shown. This state is triggered by the detection of non-tone cells, right after a confirmed tone and it has the responsibility to decide whether the current tone interruption is a pause or interruption, having a duration less than Te, or it represents the end of the tone.

The method may continue with this state and add a duration of the current input cell to the pause duration counter 232 and add the cell to the delay line as "unconfirmed" 234, when the incoming non-tone cells do not cumulate a duration of Te 236, as shown in path 238, 240. The new meta-information for cells inserted into the delay line will be marked as unconfirmed.

After a non-tone period of Te 236, the method may confirm that it is the end-of tone and may mark all the unconfirmed cells with silence indication 242 and may continue in the "non-tone" state 244, cf. path 242, 244. This operation may require internal access to meta-information for the cells from the delay line. Therefore this data structure may for example be implemented as a queue with internal visibility.

The method may decide that the previous non-tone cells are part of a DTMF pause or interruption when the currently read 228 input cell contains tone information 230. Therefore the tone may continue, and the pause, marked with unconfirmed cells, must be ignored 246. Therefore, unconfirmed media cells from the delay line may be updated 246, 248 as if the pause has not appeared. In this case, the method will enter in "tone" state 250 again.

Figure 13:
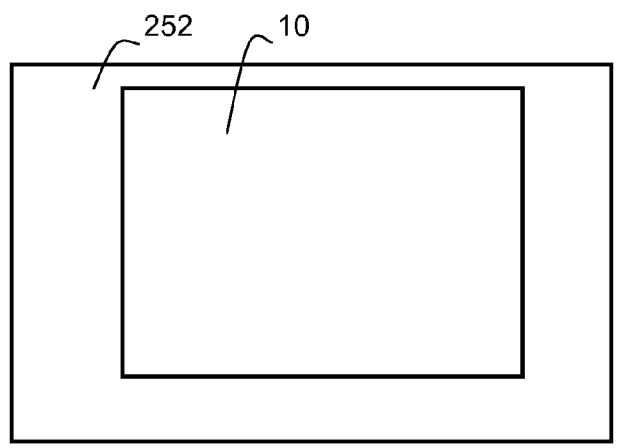
FIG. 13 schematically shows a diagram of an example of an embodiment of a voice over IP transmission system.

Referring now also to FIG. 13, a diagram of an example of an embodiment of a voice over IP transmission system is shown. A VoIP transmission system 252 may comprise a tone relay system 10 or may execute steps of a method as described above. The tone relay system may be implemented as part of a media gateway.

Furthermore, a computer program product may comprise code portions for executing steps of a tone relay method or for implementing parts of a tone relay system as described above when run on a programmable apparatus. The invention may be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims.

Some of the above embodiments, as applicable, may be implemented using a variety of different systems. For example, although FIG. 1 and the discussion thereof describe an exemplary system, this exemplary system is presented merely to provide a useful reference in discussing various aspects of the invention. Of course, the description has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or impose an alternate decomposition of functionality upon various logic blocks.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as a memory or other media on other computer systems. Such computer readable media may be permanently, removably or remotely coupled to system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. The programmable apparatus may for example comprise a processing device or processing unit being one or more of a group consisting of: microprocessor, central processing unit, a graphics processor, coprocessor, digital signal processor, embedded processor application specific integrated circuit (ASIC), field programmable gate array (FPGA), a device implementing a state machine, a microcontroller unit (MCU).

Furthermore, the devices may be physically distributed over a number of apparatuses, while functionally operating as a single device. In one embodiment, system 10 is a part of a computer system such as a personal computer system. In another embodiment, system 10 may be comprised in a programmable apparatus for example being a distributed computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While the principles of the invention have been described above in connection with specific apparatus, it is to be clearly understood that this description is made only by way of example and not as a limitation on the scope of the invention.

The invention claimed is:

1. A tone relay system, comprising a tone detector arranged to receive a sequence of signal samples and to provide a plurality of media descriptors, each media descriptor an instance of a data structure, wherein: a first component of the data structure comprises a cell of one or more signal samples; and a second component of the data structure comprises tone detection meta-information for said cell; a tone aggregator module; an encoder module; and a tone relay module arranged to receive each media descriptor, to perform an evaluation of said meta-information of said media descriptor and modify said meta-information of said media descriptor depending on one or more preceding media descriptors when a result of said evaluation indicates an undetermined tone state, to provide said media descriptors with a predetermined delay to the tone aggregator module, when said meta-information indicates a tone, for transmission over a network, wherein said tone relay module is arranged to confirm a start of said tone depending on a first duration (Ts) after an indicated start of said tone; durations of the one or more signal samples of the cells of the media descriptors are less than the first duration Ts; and the providing comprises: storing the cells of received signal samples in a buffer; and inserting other cells comprising digital silence into the buffer prior to the cells of received signal samples; and to provide said media descriptors without said predetermined time delay to the encoder module, for transmission over said network, otherwise.

2. The tone relay system as claimed in claim 1, comprising a delay line arranged to store said one or more preceding media descriptors for a time corresponding to said predetermined delay.

3. The tone relay system as claimed in claim 1, wherein said tone detector is arranged to analyze said cells and generate said meta-information, and wherein said meta-information of said cells comprises a tone detected information, an undetermined tone information, and a non-tone detected information.

4. The tone relay system as claimed in claim 3, wherein said tone relay module is arranged to determine said undetermined tone state and verify or change said meta-information of said media descriptor and said preceding media descriptors to said tone detected information, a silence information, or said non-tone detected information.

5. The tone relay system as claimed in claim 1, wherein said tone is a dual-tone multi-frequency (DTMF) tone.

6. The tone relay system as claimed in claim 1, wherein said first duration Ts is 40 milliseconds or more.

7. The tone relay system of claim 6, wherein the durations of the one or more signal samples of the cells of the media descriptors are approximately 5 milliseconds.

8. The tone relay system as claimed in claim 1, wherein said first duration Ts corresponds to said predetermined delay.

9. The tone relay system as claimed in claim 1, wherein said relay module is arranged to confirm an end of said tone depending on a second duration (Te) after an indicated end of said tone.

10. The tone relay system as claimed in claim 9, wherein said second duration is 20 milliseconds or less.

11. The tone relay system of claim 9, wherein the tone relay module is arranged to filter out a received sequence of signal samples comprising a tone interruption when the tone interruption is not confirmed as an end of tone signal.

12. The tone relay system as claimed in claim 1, wherein said signal samples comprise voice or music samples.

13. The tone relay system of claim 1 arranged to store the plurality of media descriptors received by the tone relay module in a buffer, wherein:
the tone relay module is arranged to provide said sequence of signal samples with a predetermined delay to the tone aggregator module by inserting media descriptors in addition to the received media descriptors into the buffer prior to the received media descriptors and labeling the media descriptors as non-tone; and
the tone relay module is arranged to modify said meta-information by modifying meta-information of media descriptors stored in the buffer.

14. The tone relay system of claim 13 wherein the tone relay module is arranged to provide digital silence to the tone aggregator module during a delay between detecting a possible start of a tone and confirming the start of the tone.

15. The tone relay system of claim 13 wherein the tone relay module is arranged to provide digital silence to the tone aggregator module during a delay between detecting a possible end of a tone and confirming the end of the tone.

16. The tone relay system of claim 1, wherein the meta-information indicates a tone if the meta-information indicates an unconfirmed start of a tone, a confirmed tone, an undetermined tone state, or a possible but not yet confirmed end of tone.

17. The tone relay system as claimed in claim 1, wherein said network is a packet switched network.

18. A tone relay method, comprising receiving a sequence of signal samples; providing tone detection meta-information for a plurality of cells of the received signal samples, a cell comprising one or more of said signal samples; providing a plurality of media descriptors, each media descriptor an instance of a data structure, wherein: a first component of the data structure comprises a cell of the plurality of cells; and a second component of the data structure comprises tone detection meta-information for said cell; performing an evaluation of said meta-information and modifying said meta-information when a result of said evaluation indicates an undetermined tone state; providing said cells with a predetermined delay to a tone aggregator module, when said meta-information indicates a tone, for transmission over a network, the providing with a predetermined delay comprising: storing the cells of received signal samples in a buffer; and inserting other cells comprising digital silence into the buffer prior to the cells of received signal samples; and providing said cells of the received signal samples without said predetermined time delay to an encoder module, for transmission over said network, otherwise, wherein: the performing the evaluation comprises confirming a start of a tone depending on a first duration (Ts) after an indicated start of said tone; and durations of the one or more signal samples of the cells of the media descriptors are less than the first duration Ts.

19. A voice over internet protocol (VoIP) transmission system, comprising: a tone detector arranged to receive a sequence of signal samples and to provide tone detection meta-information for a plurality of cells of the received signal samples, a cell comprising one or more of said signal samples; a tone aggregator module; an encoder module; and a tone relay module arranged to receive each cell, to perform an evaluation of said meta-information and modify said meta-information when a result of said evaluation indicates an undetermined tone state, to provide said cells with a predetermined delay to the tone aggregator module, when said meta-information indicates a tone, for transmission over a network, wherein: said tone relay module is arranged to confirm a start of said tone depending on a first duration (Ts) after an indicated start of said tone; durations of the one or more signal samples of the cells are less than the first duration Ts; and the providing with a predetermined delay comprises: storing the cells of received signal samples in a buffer; and inserting other cells comprising digital silence into the buffer prior to the cells of received signal samples; and to provide said cells of the received signal samples without said predetermined time delay to the encoder module, for transmission over said network, otherwise.

* * * * *